(12) United States Patent
Khalaj Amineh et al.

(10) Patent No.: US 11,346,812 B2
(45) Date of Patent: May 31, 2022

(54) DOWNHOLE PIPE INSPECTION TOOL UTILIZING ELECTROMAGNETIC ENERGY

(71) Applicant: Halliburton Energy Services, Inc., Houston, TX (US)

(72) Inventors: Reza Khalaj Amineh, Houston, TX (US); Luis Emilio San Martin, Houston, TX (US); Burkay Donderici, Pittsford, NY (US)

(73) Assignee: Halliburton Energy Services, Inc., Houston, TX (US)

( * ) Notice: Subject to any disclaimer, the term of this patent is extended or adjusted under 35 U.S.C. 154(b) by 557 days.

(21) Appl. No.: 16/066,423

(22) PCT Filed: Mar. 7, 2016

(86) PCT No.: PCT/US2016/021175
§ 371 (c)(1),
(2) Date: Jun. 27, 2018

(87) PCT Pub. No.: WO2017/155501
PCT Pub. Date: Sep. 14, 2017

(65) Prior Publication Data
US 2019/0004012 A1    Jan. 3, 2019

(51) Int. Cl.
| | |
|---|---|
| *G01N 27/90* | (2021.01) |
| *G01N 27/9013* | (2021.01) |
| *G01N 17/00* | (2006.01) |
| *G01N 27/87* | (2006.01) |

(Continued)

(52) U.S. Cl.
CPC .......... *G01N 27/902* (2013.01); *G01N 17/006* (2013.01); *G01N 27/87* (2013.01); *G01N 27/904* (2013.01); *F16L 2101/30* (2013.01)

(58) Field of Classification Search
CPC ....... G01N 27/72–9093; G01N 17/006; G01V 3/18–34
See application file for complete search history.

(56) References Cited

U.S. PATENT DOCUMENTS

| | | | | |
|---|---|---|---|---|
| 2,992,390 | A | * | 7/1961 | De Witte ................. G01B 7/10 324/220 |
| 3,561,007 | A | * | 2/1971 | Gouilloud et al. ... E21B 47/026 324/333 |

(Continued)

OTHER PUBLICATIONS

PCT Application Serial No. PCT/US2016/021175, International Search Report, dated Dec. 5, 2016, 3 pages.

(Continued)

*Primary Examiner* — Huy Q Phan
*Assistant Examiner* — David B Frederiksen
(74) *Attorney, Agent, or Firm* — Delizio, Peacock, Lewin & Guerra

(57) ABSTRACT

An inspection tool apparatus includes a core having an axial length. The axial length is determined based on a desired depth of inspection radially from the core. A plurality of arms are coupled to and extend radially from the core. The core and the plurality of arms comprise a high permeability magnetic material. The core or at least one of the plurality of arms is wound by a respective coil that is positioned to receive magnetic flux that is passing through the core or at least one of the plurality of arms.

19 Claims, 12 Drawing Sheets

(51) Int. Cl.
*G01N 27/904* (2021.01)
*F16L 101/30* (2006.01)

(56) References Cited

U.S. PATENT DOCUMENTS

| | | | | |
|---|---|---|---|---|
| 4,780,962 | A * | 11/1988 | Smith | G01B 5/207 33/302 |
| 5,299,359 | A * | 4/1994 | Estes | E21B 47/08 33/544 |
| 5,864,232 | A | 1/1999 | Laursen | |
| 5,869,968 | A * | 2/1999 | Brooks | G01V 3/30 324/338 |
| 2003/0011363 | A1* | 1/2003 | Wayman | G01N 27/82 324/238 |
| 2005/0242819 | A1* | 11/2005 | Gold | G01V 3/28 324/367 |
| 2006/0076951 | A1 | 4/2006 | Nestleroth et al. | |
| 2006/0202686 | A1 | 9/2006 | Barolak et al. | |
| 2008/0062036 | A1* | 3/2008 | Funk | E21B 43/267 342/22 |
| 2009/0166035 | A1* | 7/2009 | Almaguer | E21B 7/061 166/254.1 |
| 2009/0195244 | A1 | 8/2009 | Mouget et al. | |
| 2009/0234590 | A1 | 9/2009 | McNealy et al. | |
| 2010/0192703 | A1* | 8/2010 | Huang | G01F 1/66 73/861.28 |
| 2011/0127999 | A1 | 6/2011 | Lott et al. | |
| 2011/0132082 | A1* | 6/2011 | Pico | G01V 11/005 73/152.14 |
| 2011/0167914 | A1* | 7/2011 | Sutherland | F17D 1/00 73/643 |
| 2013/0105224 | A1* | 5/2013 | Donderici | G01V 3/30 175/45 |
| 2015/0212225 | A1* | 7/2015 | Reiderman | E21B 47/13 324/303 |
| 2015/0323697 | A1* | 11/2015 | Ohmer | E21B 47/08 324/333 |
| 2016/0178579 | A1* | 6/2016 | Donderici | G01N 27/82 324/238 |
| 2016/0187523 | A1* | 6/2016 | Sanmartin | G01N 27/82 324/339 |
| 2016/0282504 | A1* | 9/2016 | Wilson | E21B 47/007 |
| 2018/0172418 | A1* | 6/2018 | Ohmer | G01B 5/12 |

OTHER PUBLICATIONS

PCT Application Serial No. PCT/US2016/021175, International Written Opinion, dated Dec. 5, 2016, 10 pages.
Arbuzov, "Memory Magnetic Imaging Defectoscopy", Society of Petroleum Engineers, SPE162054 Russian Oil and Gas Exploration and Production Technical Conference and Exhibition, Moscow, Russia, Oct. 16-18, 2012, 10 pgs.
Garcia, et al., "Successful Application of a New Electromagnetic Corrosion Tool for Well Integrity Evaluation in Old Wells Completed With Reduced Diameter Tubular", International Petroleum Technology Conference, IPTC 16997, Mar. 2013, China, 13 pages.

* cited by examiner

DOWNHOLE PIPE INSPECTION TOOL UTILIZING ELECTROMAGNETIC ENERGY

BACKGROUND

Hydrocarbon production may use metal pipes, disposed in a geological formation, for bringing the hydrocarbons to the surface. Since hydrocarbon production may last for years or even decades, it is desirable to monitor the status of the metal pipes to determine if corrosion has degraded the pipe.

DETAILED DESCRIPTION

The challenge noted above, as well as others, can be addressed by the various examples of an inspection tool as disclosed herein. By using a relatively high permeability magnetic material core with a plurality of arms, comprising a substantially similar material, extending radially from the core, the tool may provide azimuthal resolution (i.e., sensitivity) for evaluation of pipes (e.g., casings) in cased boreholes. The disclosed tool and method may provide the azimuthal resolution in evaluation of one or more pipes by directing the flux of the primary field toward the inspected region. The pipes may thus be characterized with improved sensitivity and resolution to provide a more precise evaluation of the pipes and, ultimately, lead to a positive impact on the hydrocarbon production process.

The subsequently described example inspection tools use an electromagnetic (EM) technique based on generating the primary field into the pipe(s), using one or more transmit coils, to produce eddy currents in the pipe(s). The eddy currents, in turn, produce secondary fields that are emitted from the pipe(s). Characterization of the pipes may then be performed by measuring and processing the secondary fields scattered by the pipes.

In the interest of clarity and brevity, subsequent reference is made to pipes. However, the examples disclosed here work equally well with any metal structure such as metal casings, tubing, collars, filters, packers, and perforations. Thus, the term "pipe" is used to refer to these structures as well as other metal structures.

Figure 1:
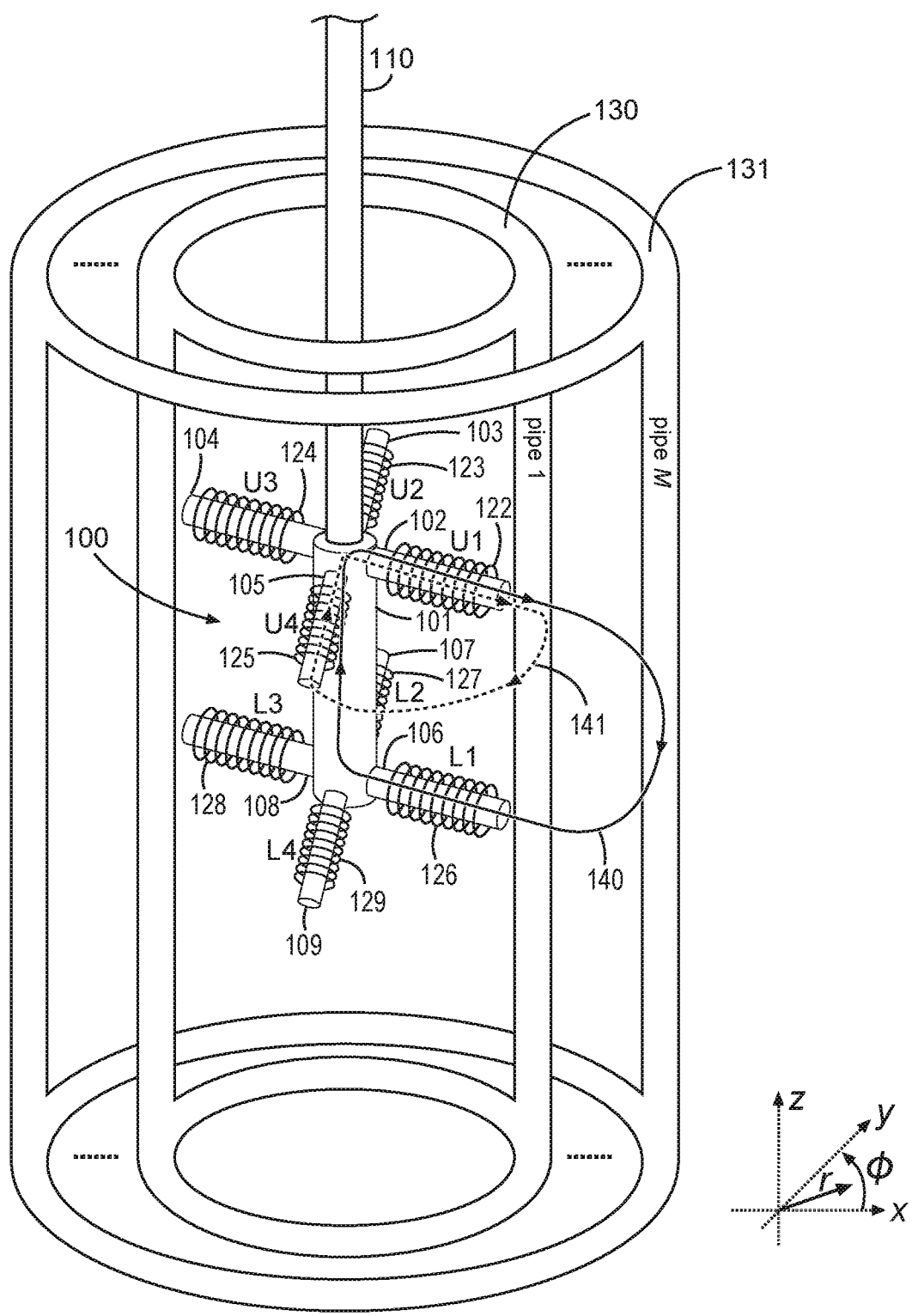
FIGS. 1-7 are diagrams showing various examples of an inspection tool in a system of pipes, according to various examples of the disclosure.

FIG. 1 is a diagram showing an inspection tool 100 in a system of pipes 130, 131, according to various examples of the disclosure. The example of FIG. as well as the subsequently described examples, describe the inspection tool 100 in a system of 1-M pipes 130, 131. The examples are not limited to any one quantity of pipes 130, 131. For example, the inspection tool 100 may operate in only one pipe 130 or some larger quantity of pipes e.g., M pipes).

The inspection tool 100 comprises a core 101 having an axial length. The axial length may be determined based on a desired depth of inspection into the system of pipes 130, 131. For example, a longer axial length results in an electromagnetic field that can penetrate to greater depth into the system of pipes 130, 131. Conversely, a shorter axial length results in an electromagnetic field with smaller depth of inspection.

The inspection tool 100 further comprises a plurality of azimuthal arms 102-109 coupled to and extending radially from the core 101. The plurality of arms 102-109 may be spaced approximately 90° apart as shown in FIG. 1 or have some other spacing in order to extend in various azimuthal directions. The plurality of arms 102-109 may comprise a first set of arms 102-105 coupled to an upper portion of the core 101 and a second set of arms 106-109 coupled to a lower portion of the core 101. The two sets of arms may be separated by the axial length of the core 101.

Each of the arms 102-109 includes a coil 122-129 that is positioned on its respective arm such that is receives the magnetic flux that is passing through the respective arm. Each coil 122-129 is wound around its respective arm in the illustrated example of FIG. 1.

During operation, the ends of the arms 102-109 may substantially contact the sides of the inner-most pipe 130 while the inspection tool 100 is rotating. This contact may be improved by using a ferromagnetic fluid to provide better magnetic contact. The fluid may be held in place by the attraction provided by the magnetic nature of ferrites. In another example, the contact may be improved by brushes, as illustrated in subsequent examples. The fluid and/or the brushes may be used in other examples disclosed herein.

The coils 122-125 of the first set of the arms 102-105 may be used to transmit the electromagnetic energy while the coils 126-129 of the second set of the arms 106-109 may be used to receive the secondary electromagnetic field resulting from the eddy current induced in the system of pipes by the transmitted electromagnetic field. In another example, the role of transmitting and receiving coils may be reversed such that the coils 122-125 of the first set of arms 102-105 are used to receive while the coils 126-129 of the second set of arms 106-109 are used to transmit.

Transmission of the electromagnetic field may result in one or more paths 140, 141 of energy through the system of pipes 130, 131. It is desirable for the received path to be from the coils 122-125 of the first set of the arms 102-105 to the coils 126-129 of the second set of arms 106-109, or vice versa. This is indicated as a desirable path 140 that produces a more focused route through the pipes 130, 131. A less desirable path 141 is from a coil in one set of arms to another coil in the same set of arms. This path 141 is not as focused and may not achieve desirable results since a greater area of the pipe may be analyzed at one time. The method illustrated in the flowchart of FIG. 8 may be used to reduce or eliminate the less desirable paths 141 by reducing or eliminating responses received by certain ones of the coils.

A cable 110 (e.g., wireline) is coupled to the core 101. The wireline 110 provides the ability to transmit signals, such as the electromagnetic energy to be emitted from a coil, from the surface to the inspection tool 100. The wireline 110 also provides the ability to transmit signals, such as secondary electromagnetic fields measurements received from the system of pipes 130, 131, from the inspection tool 100 to the surface.

By mounting the tool on a rotating frame, the tool can be made to rotate within the system of pipes 130, 131. The rotational movement enables the inspection tool to inspect substantially all of the pipe structure while it is being raised or lowered within the pipes being inspected.

The inspection tool apparatus 100 of FIG. 1, as well as the other apparatus examples illustrated in FIGS. 2-7, use high permeability magnetic materials for the core and/or the plurality of arms. This type of material improves the focus of the emitted magnetic field toward various azimuthal directions. Such a focusing mechanism may increase the sensitivity of the inspection tool and enable detection and evaluation of smaller defects in the pipes. This is desirable, in particular, when evaluating the outer-most pipes of a system of pipes since the outer-most pipe responses may be weaker compared with the responses from the inner-most pipes.

As used herein, permeability is a measure of the ability of a material to support the formation of a magnetic flux density within itself. Hence, it is the degree of magnetization that a material obtains in response to an applied magnetic field. Thus, a relatively high permeability material (e.g., iron, mu-metal) may be defined as one having a higher degree of support for formation of a magnetic flux relative to other materials.

Figure 2:
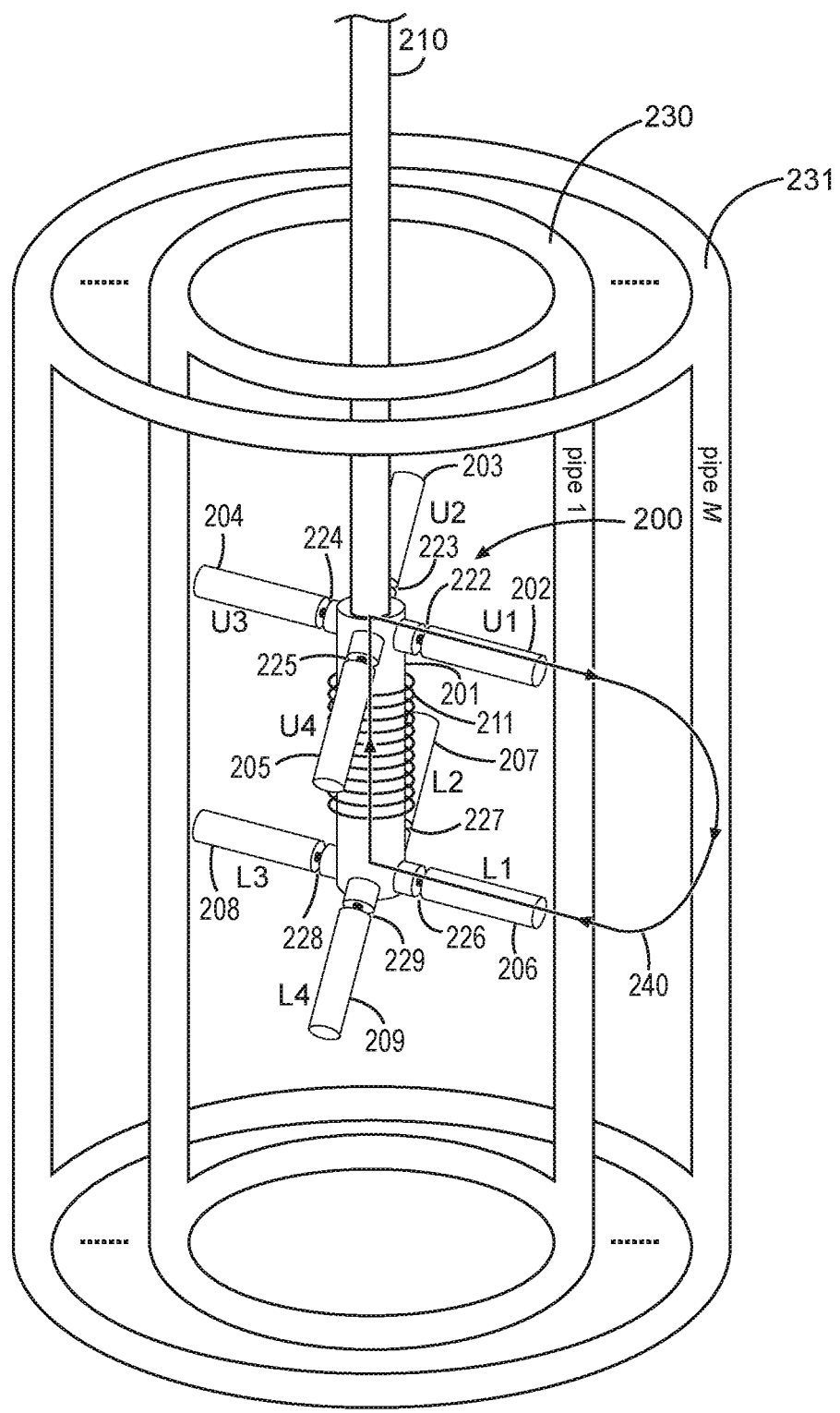

FIG. 2 is a diagram showing another example of the inspection tool 200 in a system of pipes 230, 231, according to various examples of the disclosure. This example includes controllable gaps 222-229 between the core 201 and the arms 202-209.

The inspection tool 200 comprises a core 201 having an axial length. The axial length may be determined based on a desired depth of inspection into the system of pipes 230, 231. For example, a longer axial length results in an electromagnetic field that can penetrate to greater depth into the system of pipes 230, 231. Conversely, a shorter axial length results in an electromagnetic field with smaller depth of inspection.

The inspection tool 200 further comprises a plurality of arms 202-209 coupled to and extending radially from the core 201. The plurality of arms 202-209 may be spaced approximately 90° apart as shown in FIG. 2 or have sonic other spacing. The plurality of arms 202-209 may comprise a first set of arms coupled to an upper portion of the core 201 and a second set of arms coupled to a lower portion of the core 201. The two sets of arms may be separated by the axial length of the core 201.

Each of the plurality of arms 202-209 is coupled to the core through a controllable gap 222-229 that provides the ability to mechanically attach and detach each arm 202-209 individually from the core 201. By individually mechanically attaching and detaching the arms 202-209 from the core 201, the unwanted paths of the field may be reduced or eliminated.

The controllable gap 222-229 may be implemented through solenoids between each respective arm 202-209 and the core 201. By attaching the arms 202-209 corresponding to the same azimuthal positions simultaneously, the emitted field may be directed toward that particular azimuthal direction. One example path 240 is shown in FIG. 2.

A cable 210 (e.g., wireline) is coupled to the core 201. The wireline 210 provides the ability to transmit signals, such as the electromagnetic energy to be emitted from a coil, from the surface to the inspection tool 200. The wireline 210 also provides the ability to transmit signals, such as secondary electromagnetic fields measurements received from the system of pipes 230, 231, from the inspection tool 200 to the surface.

The wireline 210 may also provide rotational movement of the inspection tool 200 within the system of pipes 230, 231. The rotational movement enables the inspection tool to inspect substantially all of the pipe structure while it is being raised or lowered within the pipes being inspected.

A transmitter and receiver coil 211 is wound around the core 201. A signal from the wireline 210 may be radiated as electromagnetic energy into the system of pipes 230, 231 from this coil 211. The magnetic material of a first arm (e.g., arm 202), in the first set of arms, helps to direct the electromagnetic field to the pipes 230, 231 to produce the eddy current that returns through a second arm (e.g., arm 206), in the second set of arms, that is the axial length away from the first arm.

Figure 3:
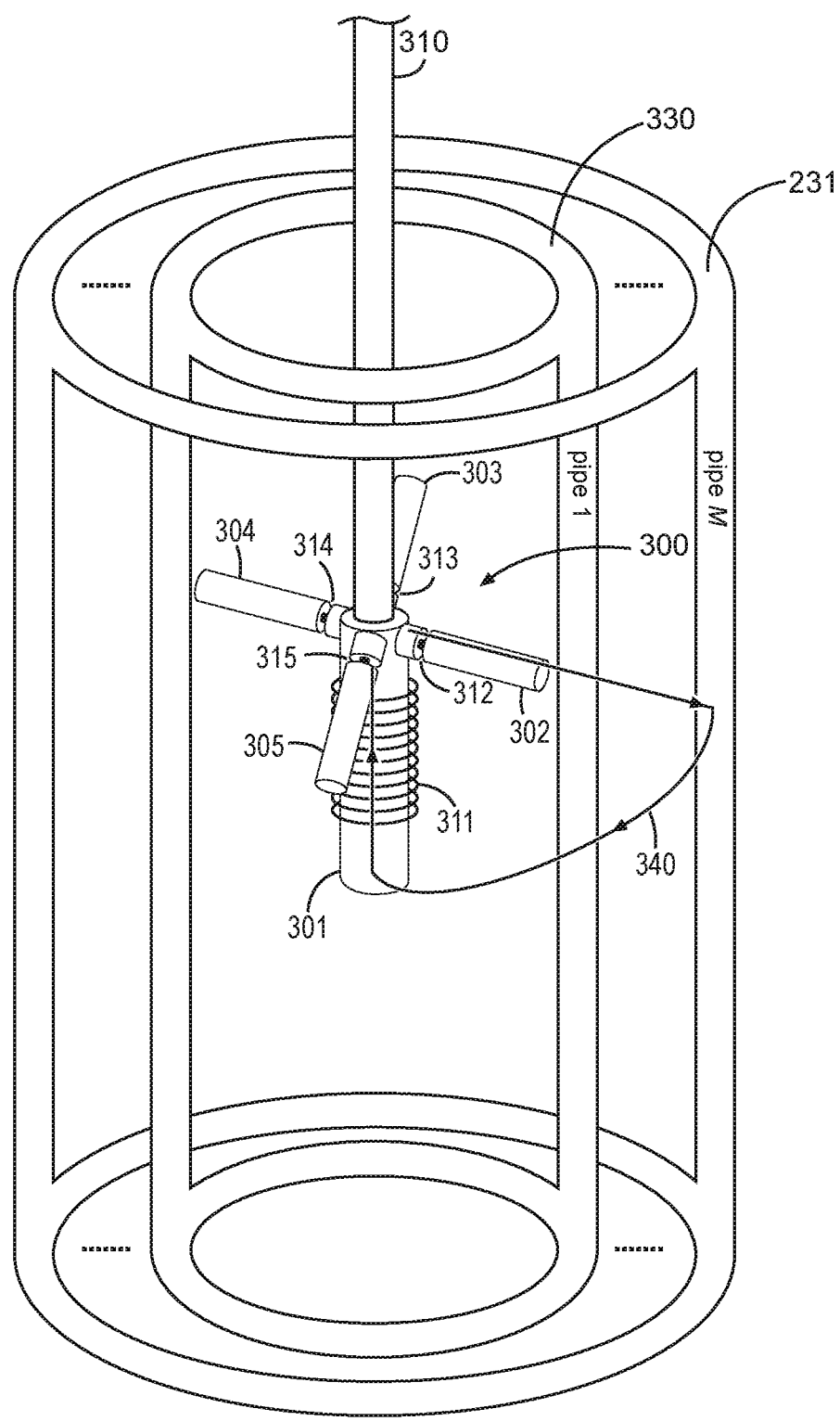

FIG. 3 is a diagram showing another example of the inspection tool 300 in a system of pipes 330, 331, according to various examples of the disclosure. This example includes only one set of a plurality of arms 302-305. While the set of arms 302-305 of FIG. 3 are shown at one end of the core 301, another example may locate the set of arms 302-305 at the opposite end of the core 301.

The plurality of arms 302-305 may be spaced approximately 90° apart as shown in FIG. 3 or have some other spacing. Each of the plurality of arms 302-306 is coupled to the core 301 through a controllable gap 312-315 that provides the ability to mechanically attach and detach each arm 302-305 individually from the core 301. By individually mechanically attaching and detaching the arms 302-305 from the core 301, the unwanted paths of the field may be reduced or eliminated.

The controllable gap 312-315 may be implemented through solenoids between each respective arm 302-305 and the core 301. The examples shown in FIGS. 1 and 2 have two sets of arms (upper and lower) at different axial positions to achieve focusing of the signal. This forces the flux to move axially in the outer pipes at a distance that is proportional to the axial length of the core between the upper and lower sets of arms. The example of the inspection tool of FIG. 3 uses a single set of azimuthal arms 302-305. This may reduce the focusing effect but may achieve a higher resolution since flux will remain focused on the outer pipe for a shorter axial length.

A cable 310 (e.g., wireline) is coupled to the core 301. The wireline 310 provides the ability to transmit signals, such as the electromagnetic energy to be emitted from a coil, from the surface to the inspection tool 300. The wireline 310 also provides the ability to transmit signals, such as secondary electromagnetic fields measurements received from the system of pipes 330, 331, from the inspection tool 300 to the surface.

By mounting the tool on a rotating frame, the tool can be made to rotate within the system of pipes 330, 331. The rotational movement enables the inspection tool to inspect substantially all of the pipe structure while it is being raised or lowered within the pipes being inspected.

A transmitter and receiver coil 311 is wound around the core 301. A signal from the wireline 310 may be radiated as electromagnetic energy into the system of pipes 330, 331 from this coil 311. The magnetic material of a first arm (e.g., arm 302) helps to direct the electromagnetic field to the pipes 330, 331 to produce the eddy current in the pipes 330, 331 in order to produce the secondary field received by the coil 311.

Figure 4:
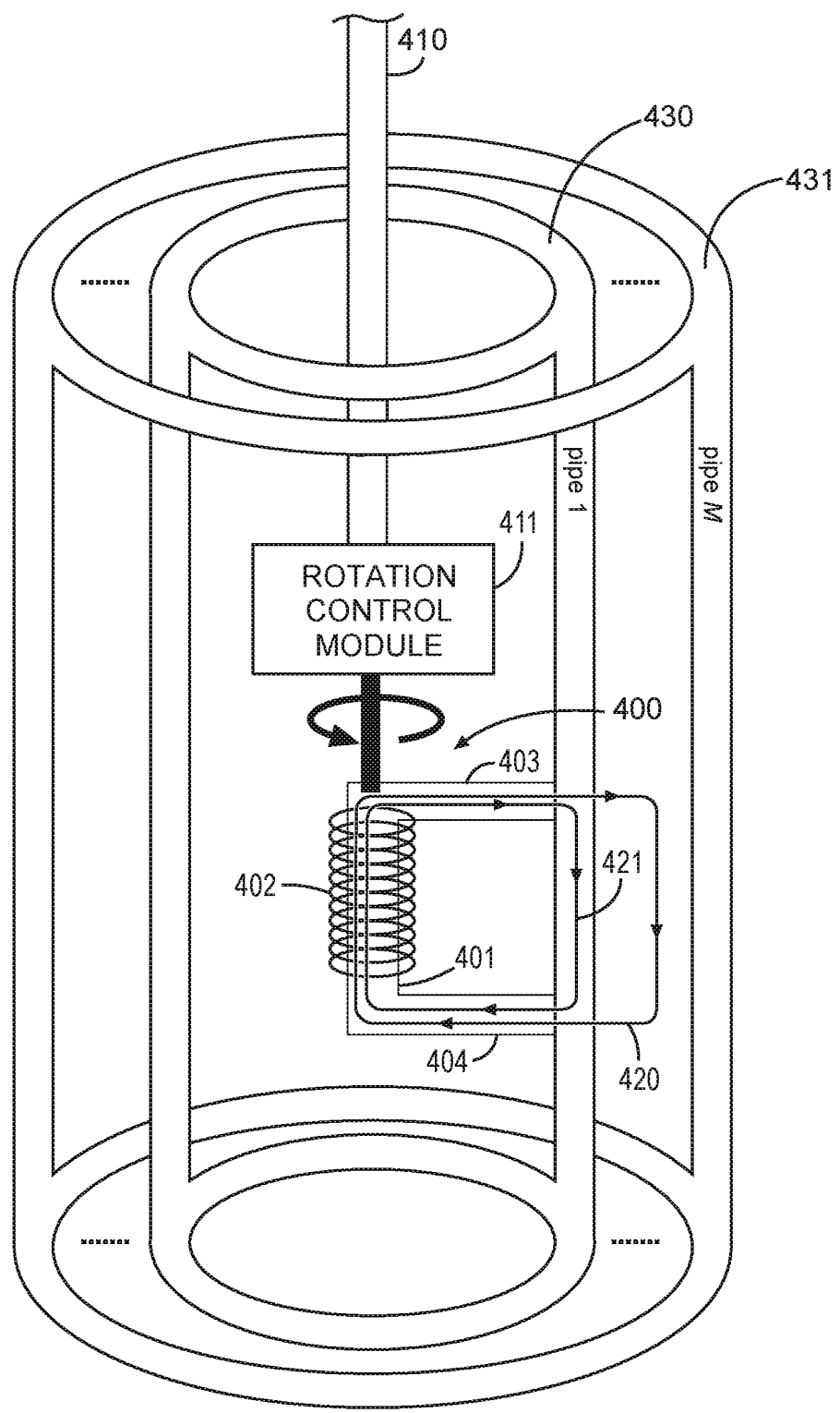

FIG. 4 is a diagram showing another example of the inspection tool 400 in a system of pipes 430, 431, according to various examples of the disclosure. This example includes a core 401 around which is wrapped the transmit and receive coil 401. A first arm 403 is coupled to an upper portion of the core 401 and a second arm 404 is coupled to a lower portion of the core 401 at substantially the axial length from the first arm 403.

A cable 410 (e.g., wireline) is coupled to the core 401. The wireline 410 provides the ability to transmit signals, such as the electromagnetic energy to be emitted from a coil, from the surface to the inspection tool 400. The wireline 410 also provides the ability to transmit signals, such as secondary electromagnetic fields measurements received from the system of pipes 430, 431, from the inspection tool 400 to the surface.

In an example, a rotational control module 411 may be coupled between the wireline 410 and the core. The rotational control module 411 may then provide the rotation of the tool 400 in order to point the arms toward various azimuthal directions and, thus, direct the electromagnetic field from the coil 402 towards that particular direction and into the pipe 430, 431. Examples of focusing paths 420, 421 through the pipes 430, 431 are illustrated.

Figure 5A:
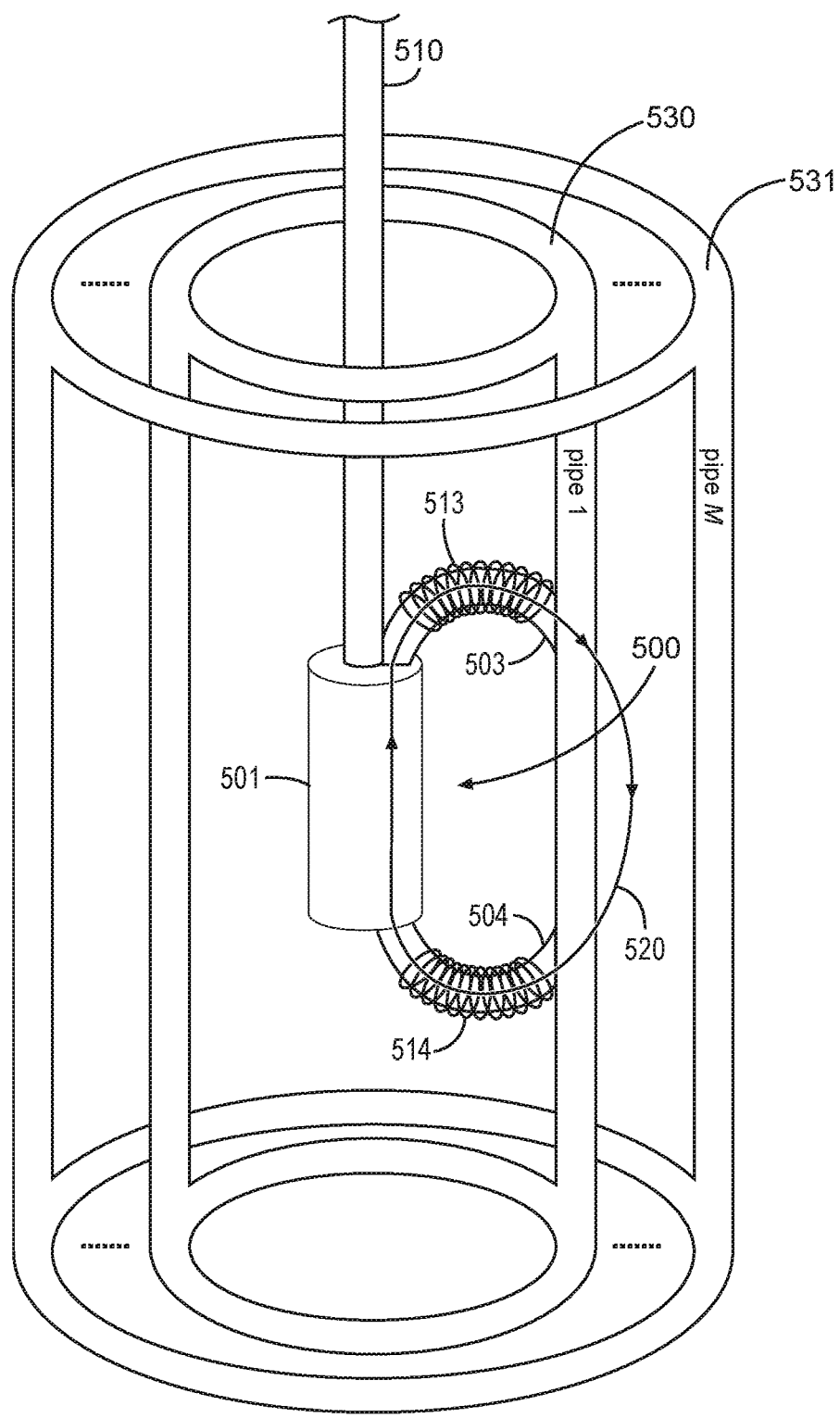
Figure 5B:
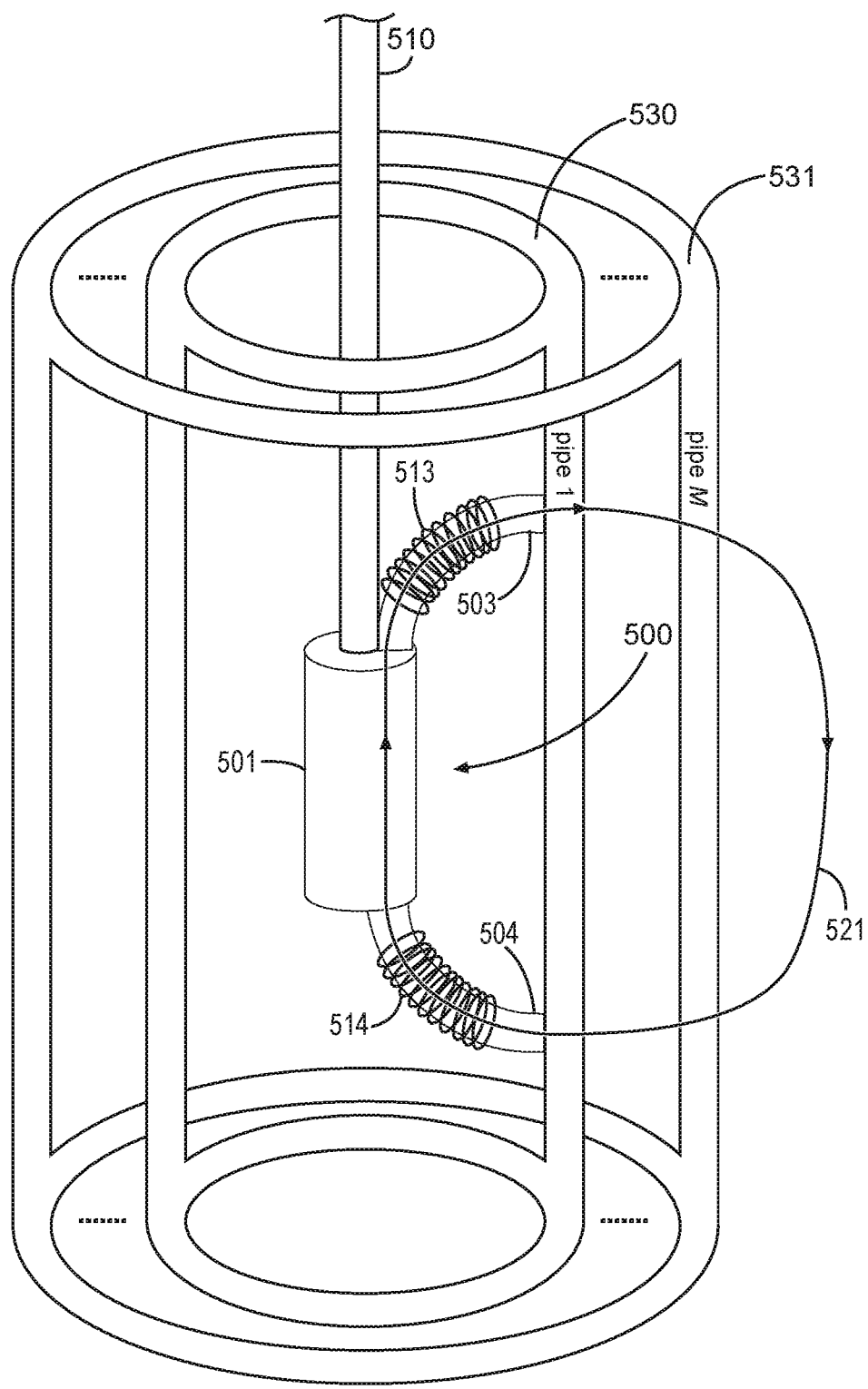

FIGS. 5A and 5B are diagrams showing different examples of the inspection tool 500 in a system of pipes 530, 531, according to various examples of the disclosure. These examples vary the depth of inspection by varying the shape of the axial arms 503, 504, varying the axial length of the core 501, or both.

The examples of FIGS. 5A and 5B are mechanically substantially similar. Both examples include first and second arms 503, 504 that are coupled to and extend radially from the core 501 in an arc. Transmit and receive coils 513, 514 are wound around each arm 513, 514.

The difference between each example of FIGS. 5A and 5B is the size of the arc exhibited by the arms 503, 504. In FIG. 5A, the arc of the arms 503, 504 is relatively small as compared to the arc of the arms 503, 504 of FIG. 5B. The size and/or shape of the arc determines the size of the transmitted electromagnetic field 520, 521 and, thus, the depth of inspection through the system of pipes 530, 531. Thus, the relatively smaller arc exhibited by the arms 503, 504 of FIG. 5A produces a relatively smaller electromagnetic field 520 while the relatively larger arc exhibited by the arms 503, 504 of FIG. 5B produces a relatively larger electromagnetic field 521.

Figure 6:
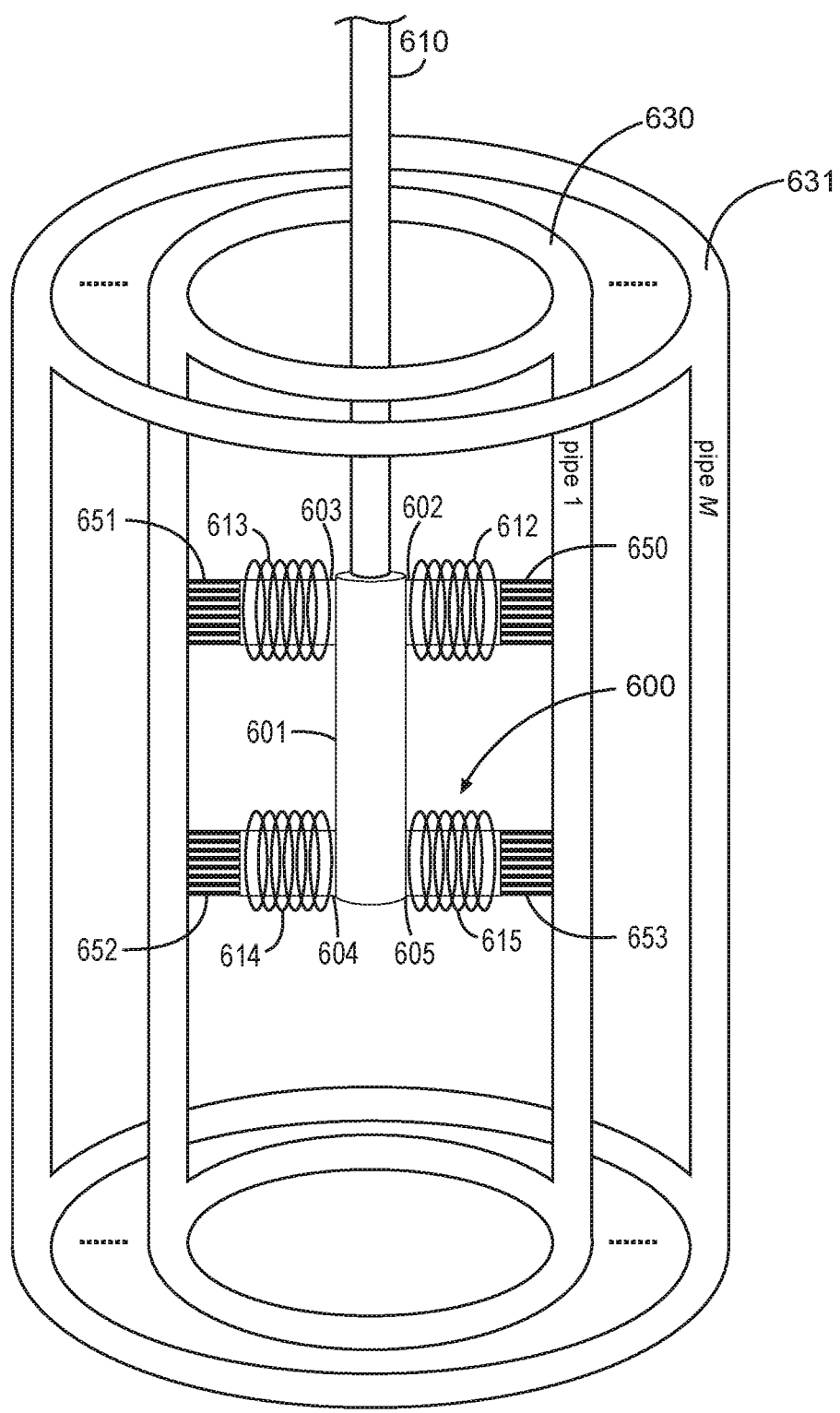

FIG. 6 is a diagram showing another example of the inspection tool 600 in a system of pipes 630, 631, according to various examples of the disclosure. A cable 710 (e.g., wireline) is coupled to the core 601 to provide the ability to transmit signals, such as the electromagnetic energy to be emitted from a coil, from the surface to the inspection tool 600. The wireline 610 also provides the ability to transmit signals, such as secondary electromagnetic fields measurements received from the system of pipes 630, 631, from the inspection tool 600 to the surface.

This example of the inspection tool 600 includes first and second arms that each comprise a first portion 602, 605 extending radially from the core 601 in a first direction and the second portion 603, 604 extending radially from the core 601 in a second direction that is substantially opposite from the first direction. Each of the first and second arms further include a transmitter and receiver coil 612-615 on each of the first and second respective portions 602-605.

Brushes 650-653 may be coupled to the ends of each of the portions 602-605 of the arms. The use of brushes 650-653 of various sizes enables the adjustment of the size of the radial section of the cores according to the inner diameter of the first pipe 630. These brushes may be used in any of the examples disclosed herein.

Figure 7:
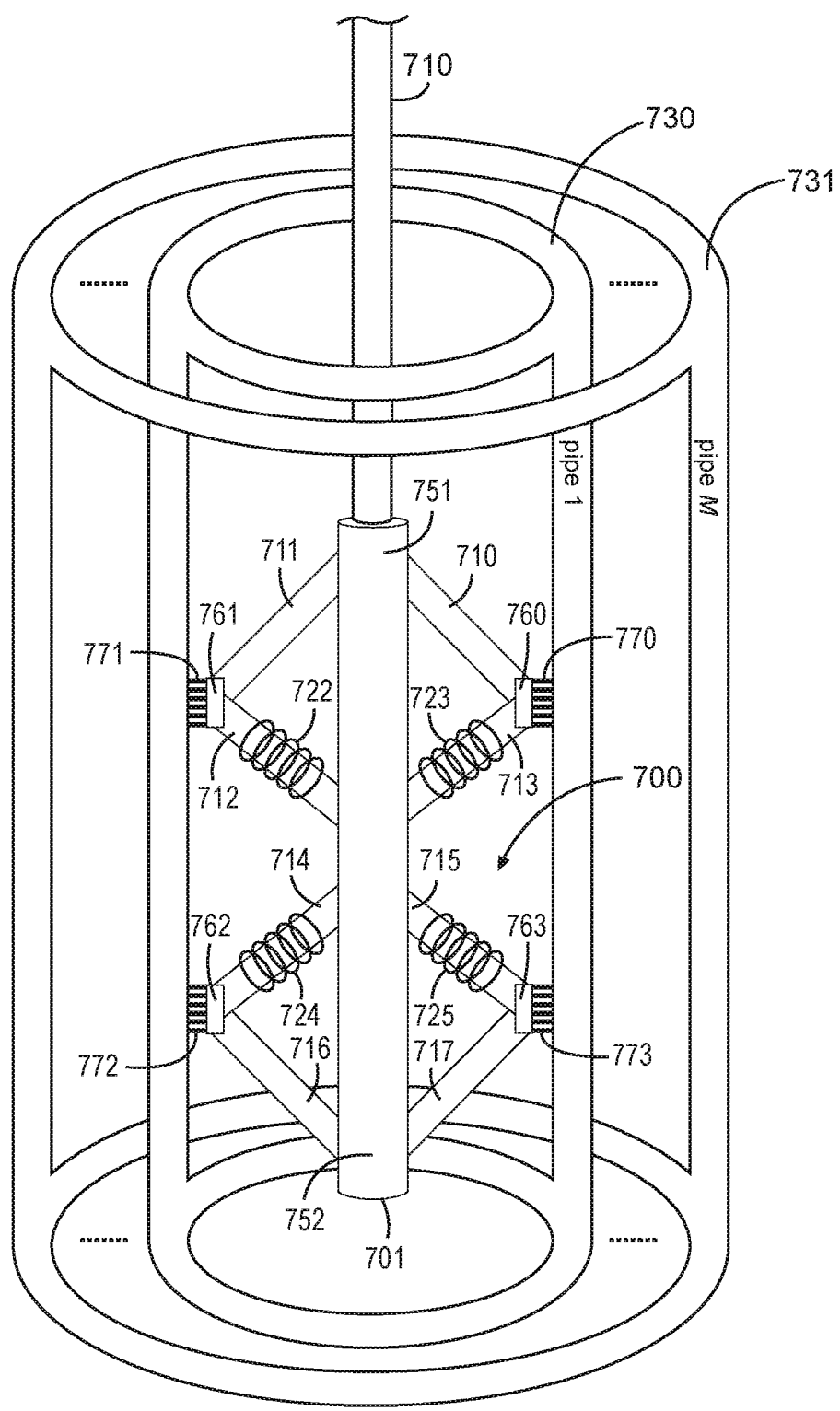

FIG. 7 is a diagram showing another example of the inspection tool 700 in a system of pipes 730, 731, according to various examples of the disclosure. This example uses a plurality of centralizer arms 710, 711, 716, 717, also made of magnetic materials, to further increase contact between the inner pipe 730 and the core 701.

This example includes a first pair of coil arms 712, 713 and a second pair of coil arms 714, 715 coupled to a central portion 750 of the core 701 and extending radially from the core 701. The plurality of centralizer arms 710, 711, 716, 717 may be described as a first pair of centralizer arms 710, 711 coupled to an upper portion 751 of the core 701 and extending radially from the core 701 as well as a second pair of centralizer arms 716, 717 coupled to a lower portion 752 of the core and extending radially from the core. Each arm of the first pair of coil arms 712, 713 is coupled to a respective one of the first pair of centralizer arms 711, 710 at respective first and second ends 761, 760. Similarly, each arm of the second pair of coil arms 714, 715 is coupled to a respective one of the second pair of centralizer arms 716, 717 at respective first and second ends 762, 763. The centralizer arms 710, 711, 716, 717 are each angled towards the respective coil arm 712-715 to which they are coupled. Each coil arm 712-715 is wound with a respective transmit and receive coil 722-725.

Brushes 770-773 may be coupled to the ends 760-763. The use of brushes 770-773 of various sizes enables the adjustment of the size of the radial section of the cores according to the inner diameter of the first pipe 730.

Figure 8:
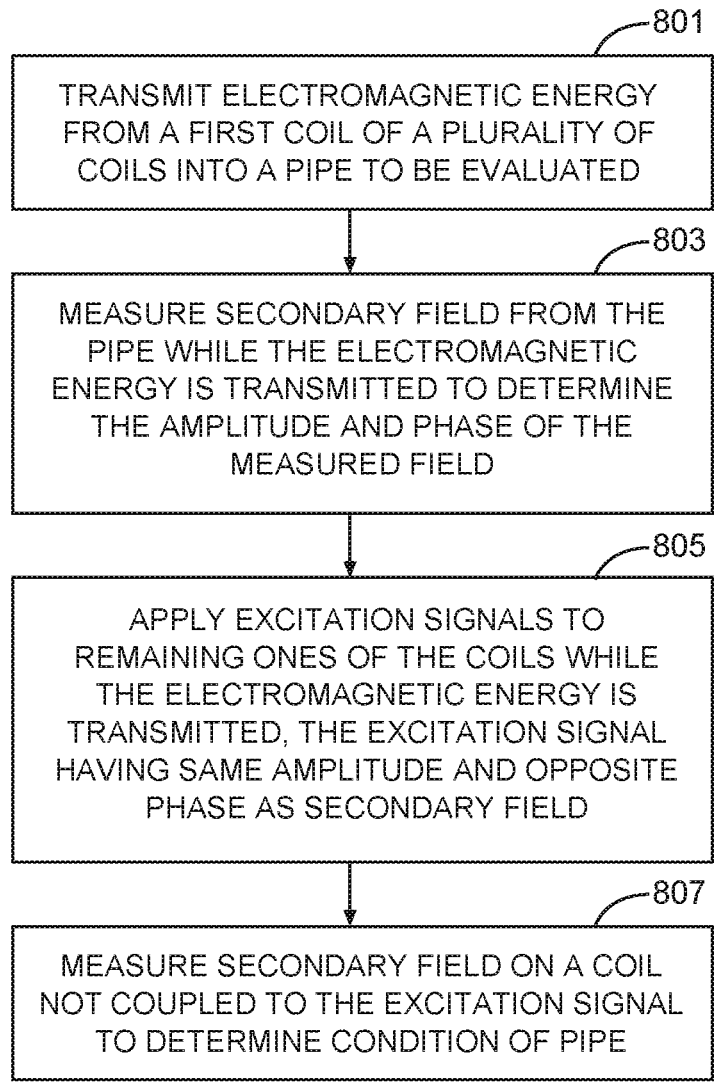
FIG. 8 is a flowchart showing a method for operation of the inspection tool, according to various examples of the disclosure.

FIG. 8 is a flowchart showing a method for operation of the inspection tool, according to various examples of the disclosure. Sampling of the responses along the axial direction and azimuthal direction enables the inspection tool, in combination with the described method, to produce a two-dimensional image of the pipe. Such an image may provide an evaluation of the condition of the pipe (e.g., defects, metal loss). An inversion algorithm may be used to compare the measured responses with responses from a library of responses in order to estimate the type and extent of the defect. The responses in the library may be provided from simulations or measurements of pre-known pipe defects.

In block 801, electromagnetic energy is transmitted from a first coil of a plurality of coils into a pipe. Each coil is coupled to a respective arm of a plurality of arms extending radially from a core of an inspection tool.

In block 803, a secondary field from the pipe is measured. The secondary field is responsive to the electromagnetic energy. The secondary field on remaining ones of the plurality of coils is measured while the electromagnetic energy is transmitted. Each secondary field has a first amplitude and a first phase.

In block 805, an excitation signal is applied to the remaining ones of the plurality of coils while the electromagnetic energy is transmitted. The excitation signal has a second amplitude and a second phase. The first and second amplitudes are substantially similar and the second phase is opposite from the first phase produced as a result the cancellation of the field at the remaining ones of the plurality of coils.

In block 807, the secondary field on a second coil of the plurality of coils is measured. This measured secondary field is indicative of a condition of the pipe.

Figure 9:
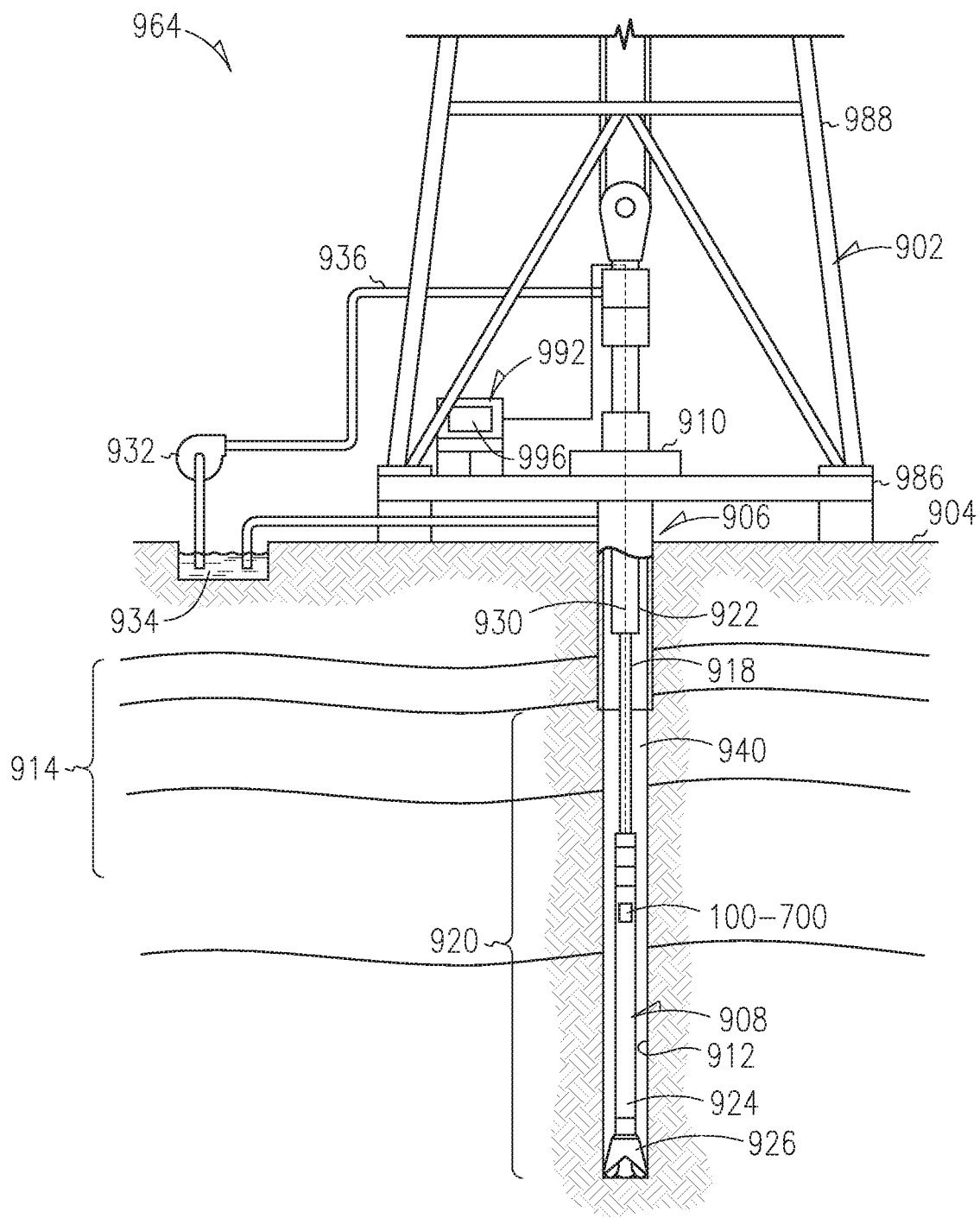
FIG. 9 is a diagram of a drilling system, according to various examples of the disclosure.

FIG. 9 is a diagram showing a drilling system, according to various embodiments. The system 964 includes a drilling rig 902 located at the surface 904 of a well 906. The drilling rig 902 may provide support for a drillstring 908. The drillstring 908 may operate to penetrate the rotary table 910 for drilling the borehole 912 through the subsurface formations 914. The drillstring 908 may include a drill pipe 918 and the bottom hole assembly (BHA) 920 (e.g., drillstring), perhaps located at the lower portion of the drill pipe 918.

The BHA 920 may include drill collars 922, a downhole tool 924, stabilizers, sensors, an RSS, a drill bit 926, as well as other possible components. The drill bit 926 may operate to create the borehole 912 by penetrating the surface 904 and the subsurface formations 914. The BHA 920 may further include a downhole tool including an example of the inspection tool 100-700 as described previously. The inspection tool 100-700 in combination with subsequently described controllers may form an inspection tool system to perform logging-while-drilling/measurements-while-drilling (LWD/MWD) operations.

During drilling operations within the borehole 912, the drillstring 908 (perhaps including the drill pipe 918 and the BHA 920) may be rotated by the rotary table 910. Although not shown, in addition to or alternatively, the BHA 920 may also be rotated by a motor (e.g., a mud motor) that is located downhole. The drill collars 922 may be used to add weight to the drill bit 926. The drill collars 922 may also operate to stiffen the BHA 920, allowing the BHA 920 to transfer the added weight to the drill bit 926, and in turn, to assist the drill bit 926 in penetrating the surface 904 and subsurface formations 914.

During drilling operations, a mud pump 932 may pump drilling fluid (sometimes known by those of ordinary skill in the art as "drilling mud") from a mud pit 934 through a hose 936 into the drill pipe 918 and down to the drill bit 926. The drilling fluid can flow out from the drill bit 926 and be returned to the surface 904 through an annular area 940 between the drill pipe 918 and the sides of the borehole 912. The drilling fluid may then be returned to the mud pit 934, where such fluid is filtered. In some examples, the drilling fluid can be used to cool the drill bit 926, as well as to provide lubrication for the drill bit 926 during drilling operations. Additionally, the drilling fluid may be used to remove subsurface formation cuttings created by operating the drill bit 926.

A workstation 992 including a controller 996 may include modules comprising hardware circuitry, a processor, and/or memory circuits that may store software program modules and objects, and/or firmware, and combinations thereof that are configured to execute at least the method of FIG. 8. The workstation 992 may also include modulators and demodulators for modulating and demodulating data transmitted downhole through the cable 930 or telemetry received through the cable 930 from the downhole environment. The workstation 992 and controller 996 are shown near the rig 902 only for purposes of illustration as these components may be located at remote locations. The workstation 992 may include the surface portion of the inspection tool system.

Figure 10:
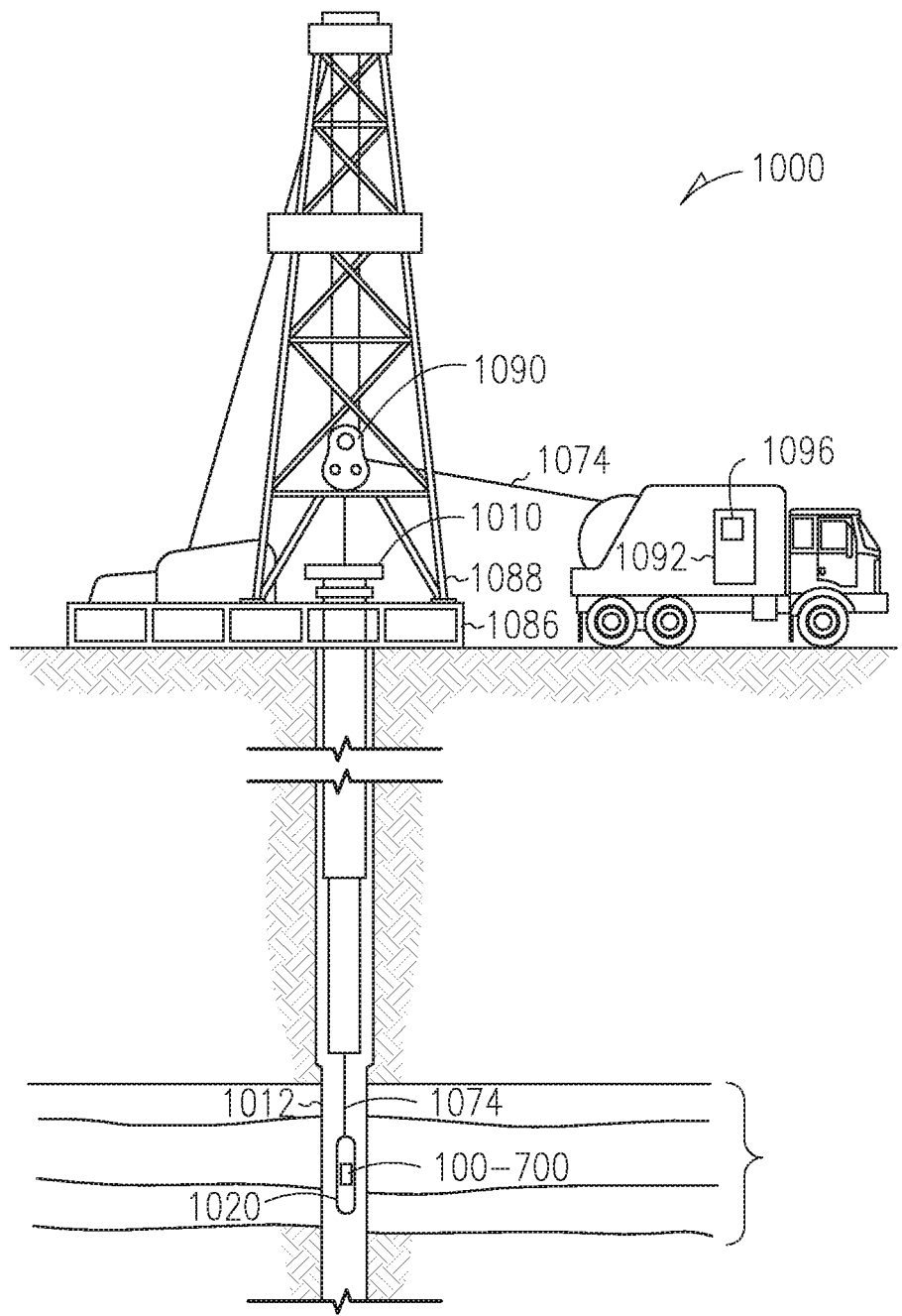
FIG. 10 is a diagram showing a wireline system, according to various examples of the disclosure.

FIG. 10 is a diagram showing a wireline system 1064, according to various examples of the disclosure. The system 1064 may comprise at least one wireline logging tool body 1020, as part of a wireline logging operation in a borehole 1012, including one or more of the examples of the inspection tool 100-700 as described previously.

A drilling platform 1086 equipped with a derrick 1088 that supports a hoist 1090 can be seen. Drilling oil and gas wells is commonly carried out using a string of drill pipes connected together so as to form a drillstring that is lowered through a rotary table 1010 into the borehole 1012. Here it is assumed that the drillstring has been temporarily removed from the borehole 1012 to allow the wireline logging tool body 1020, such as a probe or sonde with the inspection tool 100-700, to be lowered by wireline or logging cable 1074 (e.g., slickline cable) into the borehole 1012. Typically, the wireline logging tool body 1020 is lowered to the bottom of the region of interest and subsequently pulled upward at a substantially constant speed. In another example, the wireline logging tool body 1020 may be used without a drilling platform 1086 or rig 1088.

During the upward trip, at a series of depths, the inspection tool 100-700 may be used to inspect the pipes of the borehole 1012. The resulting data may be communicated to a surface logging facility (e.g., workstation 1092) for processing, analysis, and/or storage. The workstation 1092 may have a controller 1096 that is able to execute any methods disclosed herein. The workstation 1092 may include modules comprising hardware circuitry, a processor, and/or memory circuits that may store software program modules and objects, and/or firmware, and combinations thereof that are configured to execute the method of FIG. 8 as instructions.

In an example, the inspection tool 100-700 may be used to transmit an electromagnetic field and then measure the resulting secondary electromagnetic field responses generated by the pipes being inspected. The resulting data may be transmitted to the surface workstation 1092 via telemetry. The workstation 1092, with its controller 1096, may process that telemetry, execute any methods disclosed herein, and generate a two-dimensional image of the downhole pipes in order to describe the presence of defects in the system of pipes. Other examples may implement the inspection tool with coiled tubing or downhole tractor.

Figure 11:
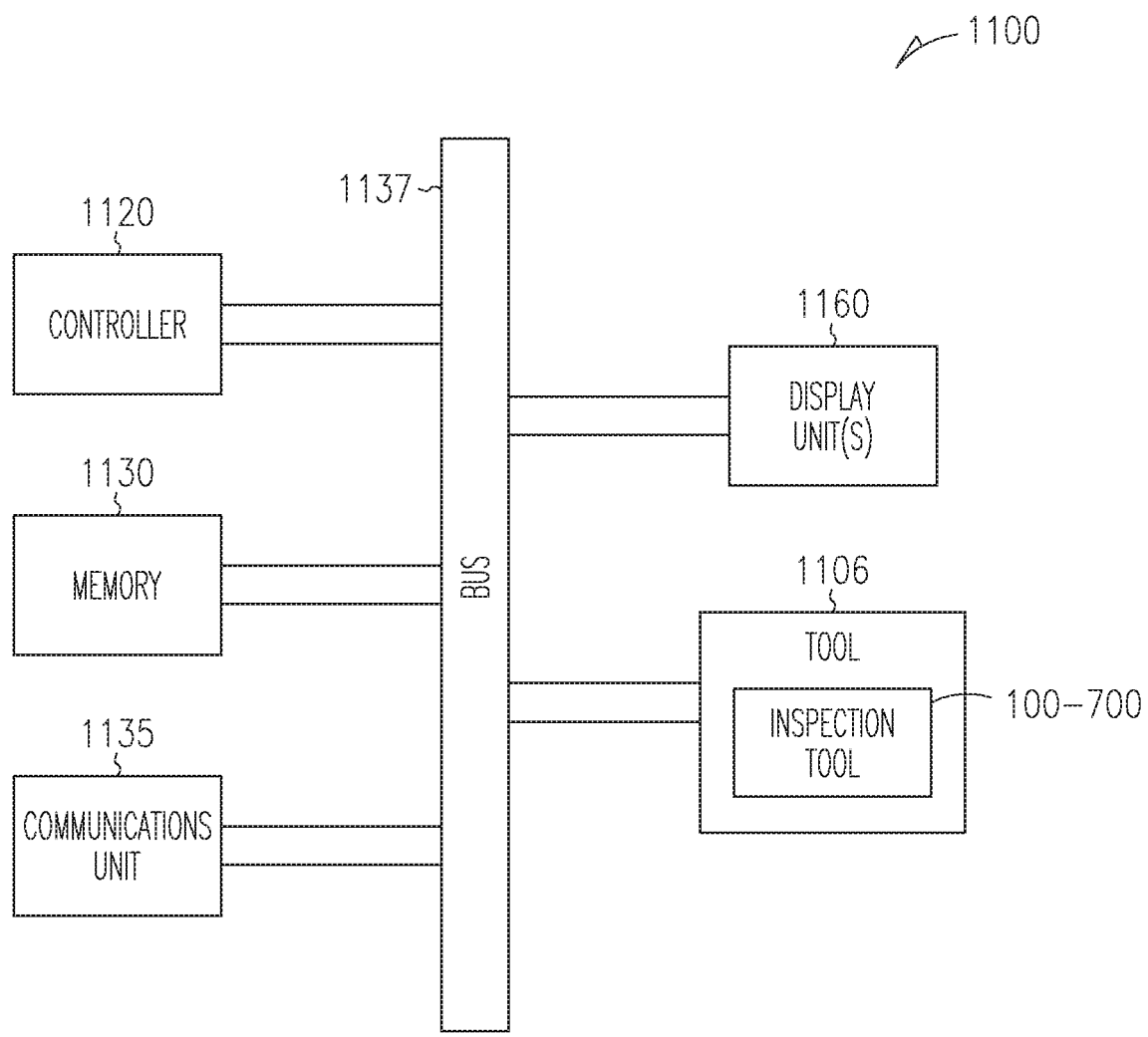
FIG. 11 is a block diagram of an example system operable to implement the activities of multiple methods, according to various examples of the disclosure.

FIG. 11 is a block diagram of an example system 1100 operable to implement the activities of multiple methods, according to various examples of the disclosure. The system 1100 may include a tool housing 1106 having the inspection tool 100-700 disposed therein. The system 1100 may be implemented as shown in FIGS. 9 and 10 with reference to the workstation 992 and controller 996.

The system 1100 may include circuitry such as a controller 1120, a memory 1130, and a communications unit 1135. The memory 1130 may be structured to include a database. The controller 1120, the memory 1130, and the communications unit 1135 may be arranged to operate as a processing unit to control operation of the inspection tool 100 and execute any methods disclosed herein in order to determine the condition of borehole pipes.

The communications unit 1135 may include communications capability for communicating from downhole to the surface or from the surface to downhole. Such communications capability can include a telemetry system such as mud pulse telemetry. In another example, the communications unit 1135 may use combinations of wired communication technologies and wireless technologies.

The system 1100 may also include a bus 1137 that provides electrical conductivity among the components of the system 1100. The bus 1137 can include an address bus, a data bus, and a control bus, each independently configured or in an integrated format. The bus 1137 may be realized using a number of different communication mediums that allows for the distribution of components of the system 1100. The bus 1137 may include a network. Use of the bus 1137 may be regulated by the controller 1120.

The system 1100 may include display unit(s) 1160 as a distributed component on the surface of a wellbore, which may be used with instructions stored in the memory 1130 to implement a user interface to monitor the operation of the tool 1106 or components distributed within the system 1100.

The user interface may be used to input parameter values for thresholds such that the system 1100 can operate autonomously substantially without user intervention in a variety of applications. The user interface may also provide for manual override and change of control of the system 1100 to a user. Such a user interface may be operated in conjunction with the communications unit 1135 and the bus 1137.

These implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

Example 1 is an inspection tool apparatus comprising: a core having an axial length, wherein the axial length is determined based on a desired depth of inspection radially from the core; and a plurality of arms coupled to and extending radially from the core, wherein the core and the plurality of arms comprise a magnetic material; wherein the core or at least one of the plurality of arms comprise a respective receiver coil that is positioned to receive magnetic flux that is passing through the core or the at least one of the plurality of arms.

In Example 2, the subject matter of Example 1 can further include wherein the respective receiver coil is wrapped around the core or the at least one of the plurality of arms.

In Example 3, the subject matter of Examples 1-2 can further include wherein the plurality of arms comprise: a first set of arms coupled to a first location on the core; and a second set of arms coupled to a second location on the core, the second location located the axial length from the first location.

In Example 4, the subject matter of Examples 1-3 can further include wherein each arm of the first and second sets of arms comprise coils.

In Example 5, the subject matter of Examples 1-4 can further include wherein the first and second sets of arms are each coupled to the core through a controllable gap and the core comprises the respective receiver coil.

In Example 6, the subject matter of Examples 1-5 can further include wherein the controllable gap comprises a solenoid to couple the first and second sets of arms to the core.

In Example 7, the subject matter of Examples 1-6 can further include wherein the plurality of arms are individually mechanically detachable from the core.

In Example 8, the subject matter of Examples 1-7 can further include wherein the plurality of arms comprise: a first arm coupled to an upper portion of the core and extending radially from the core; and a second arm coupled to a lower portion of the core, the lower portion of the core located the axial length from the first arm, the second arm extending radially from the core.

In Example 9, the subject matter of Examples 1-8 can further include wherein the core comprises the respective receiver coil and the first and second arms extend in a substantially same direction from the core.

In Example 10, the subject matter of Examples 1-9 can further include wherein the first and second arms each comprise a coil, each of the first and second arms extending in an arc from the core, wherein a shape of the arc determines the desired depth of inspection radially from the core.

In Example 11, the subject matter of Examples 1-10 can further include wherein the first and second arms each comprise first and second portions, the first portion extending radially from the core in a first direction and the second portion extending radially from the core in a second direction that is substantially opposite from the first direction, each of the first and second arms further comprising a respective transmit coil or a respective receiver coil on respective ones of the first and second portions.

In Example 12, the subject matter of Examples 1-11 can further include wherein the plurality of arms comprise: a first pair of centralizer arms coupled to an upper portion of the core and extending radially from the core; a second pair of centralizer arms coupled to a lower portion of the core and extending radially from the core; a first pair of coil arms coupled to a central portion of the core and extending radially from the core, each arm of the first pair of coil arms coupled to a respective one of the first pair of centralizer arms at respective first and second ends, each arm comprising a respective coil; a second pair of coil arms coupled to the central portion of the core and extending radially from the core, each arm of the second pair of coil arms coupled to a respective one of the second pair of centralizer arms at respective third and fourth ends, each arm comprising a respective coil; and a plurality of magnetic brushes, each brush coupled to a respective one of the first, second, third, and fourth ends; wherein the first and second pairs of centralizer arms and the first and second pairs of coil arms comprise a magnetic material.

In Example 13, the subject matter of Examples 1-12 can further include a ferromagnetic fluid coupled between the plurality of arms and a pipe.

In Example 14, the subject matter of Examples 1-13 can further include wherein an end of each of the plurality of arms comprises a magnetic brush.

In Example 15, the subject matter of Examples 1-14 can further include a rotary system coupled to the core and configured to rotate the plurality of arms around an azimuthal direction.

Example 16 is a method for operating an inspection tool apparatus, the method comprising: transmitting electromagnetic energy from a transmit coil of a plurality of coils into a pipe, each coil coupled to a respective arm of a plurality of arms extending radially from a core; measuring, from the pipe, a secondary field responsive to the electromagnetic energy, the secondary field measured on selected remaining ones of the plurality of coils is measured while the electromagnetic energy is transmitted, each secondary field having a first amplitude and a first phase; applying an excitation signal on the selected remaining ones of the plurality of coils while the electromagnetic energy is transmitted, the excitation signal having a second amplitude and a second phase, wherein the first and second amplitudes are substantially similar and the second phase is opposite from the first phase; and measuring the secondary field on a receiver coil of the plurality of coils, the secondary field indicative of a condition of the pipe.

In Example 17, the subject matter of Example 16 can further include contacting a pipe with the plurality of arms such that the secondary field measured by the receiver coil is indicative of a defect in the pipe.

In Example 18, the subject matter of Examples 16-17 can further include wherein the first coil is part of a first set of arms of the plurality of arms and the second coil is part of a second set of arms of the plurality of arms, the first and second sets of arms extending radially from different portions of the core, the method further comprising: transmitting the electromagnetic energy into the pipe through contact of the pipe by the first set of arms; and receiving the secondary field from the pipe through contact of the pipe by the second set of arms.

In Example 19, the subject matter of Examples 16-18 can further include wherein the transmit coil is wrapped around the core or the respective arm.

Example 20 is a system comprising: a downhole tool housing configured to be lowered into a borehole comprising a pipe, the downhole tool housing including an inspection tool comprising: a core having an axial length, wherein the axial length is set based on a desired depth of inspection radially from the core into the pipe; and a plurality of arms coupled to and extending radially from the core, wherein the core and the plurality of arms comprise a magnetic material and an end of each of the plurality of arms is substantially in contact with the pipe, wherein the core or each of the plurality of arms comprise a respective coil.

In Example 21, the subject matter of Example 20 can further include wherein the inspection tool is disposed in a wireline tool or a drillstring tool.

Although specific examples have been illustrated and described herein, it will be appreciated by those of ordinary skill in the art that any arrangement that is calculated to achieve the same purpose may be substituted for the specific examples shown. Various examples use permutations anchor combinations of examples described herein. It is to be understood that the above description is intended to be illustrative, and not restrictive, and that the phraseology or terminology employed herein is for the purpose of description. Combinations of the above examples and other examples will be apparent to those of skill in the art upon studying the above description.

What is claimed is:

1. An inspection tool apparatus comprising:
a core having an axial length, wherein the axial length is determined based on a desired depth of inspection radially from the core; and
a plurality of arms mechanically coupled to and extending radially from the core, the plurality of arms comprising a first set of arms mechanically coupled to a first location on the core, each of the first set of arms comprising a transmitter coil configured to transmit electromagnetic energy, the plurality of arms further including a second set of arms mechanically coupled to a second location on the core, the second location located the axial length from the first location, each of the second set of arms comprising a receiver coil configured to receive a secondary electromagnetic field resulting from an eddy current induced in a system of one or more pipes by the transmitted electromagnetic energy;
wherein the core and the plurality of arms comprise a magnetic material.

2. The inspection tool apparatus of claim 1, wherein each arm of the first set of arms is spaced apart from one another by 90 degrees, and wherein each arm of the second sets of arms is spaced apart from one another by 90 degrees.

3. The inspection tool apparatus of claim 1, wherein the first and second sets of arms are each mechanically coupled to the core through a controllable gap and the core comprises the respective receiver coil, wherein the controllable gap comprises a solenoid to couple the first and second sets of arms to the core.

4. The inspection tool apparatus of claim 1, wherein the plurality of arms are individually mechanically detachable from the core.

5. The inspection tool apparatus of claim 1, wherein the plurality of arms comprise:
a first arm mechanically coupled to an upper portion of the core and extending radially from the core; and
a second arm mechanically coupled to a lower portion of the core, the lower portion of the core located the axial length from the first arm, the second arm extending radially from the core.

6. The inspection tool apparatus of claim 5, wherein the core comprises the first and second arms extend in a substantially same direction from the core.

7. The inspection tool apparatus of claim 5, wherein each of the first and second arms extend in an arc from the core, wherein a shape of the arc determines the desired depth of inspection radially from the core.

8. The inspection tool apparatus of claim 5, wherein the first and second arms each comprise first and second portions, the first portion extending radially from the core in a first direction and the second portion extending radially from the core in a second direction that is substantially opposite from the first direction, each of the first and second arms further comprising a respective transmit coil or a respective receiver coil on respective ones of the first and second portions.

9. The inspection tool apparatus of claim 1, further comprising a ferromagnetic fluid coupled between the plurality of arms and a pipe of the system of one or more pipes.

10. The inspection tool apparatus of claim 1, wherein an end of each of the plurality of arms comprises a magnetic brush.

11. The inspection tool apparatus of claim 1, further comprising a rotary system coupled to the core and configured to rotate the plurality of arms around an azimuthal direction.

12. The inspection tool apparatus of claim 1, wherein the system of one or more pipes comprises only one pipe.

13. The inspection tool apparatus of claim 1, wherein an end of each of the plurality of arms is in contact with a side of an inner-most pipe of the system of one or more pipes.

14. A method for operating an inspection tool apparatus, the method comprising:
transmitting electromagnetic energy from a transmit coil of a plurality of coils into a pipe, each coil coupled to a respective arm of a plurality of arms extending radially from a core;
measuring, from the pipe, a secondary field responsive to the electromagnetic energy, the secondary field measured on selected remaining ones of the plurality of coils is measured while the electromagnetic energy is transmitted, each secondary field having a first amplitude and a first phase;
applying an excitation signal on the selected remaining ones of the plurality of coils while the electromagnetic energy is transmitted, the excitation signal having a second amplitude and a second phase, wherein the first and second amplitudes are substantially similar and the second phase is opposite from the first phase; and
measuring the secondary field on a receiver coil of the plurality of coils, the secondary field indicative of a condition of the pipe.

15. The method of claim 14, further comprising contacting the pipe with the plurality of arms such that the secondary field measured by the receiver coil is indicative of a defect in the pipe.

16. The method of claim 15, wherein a first coil is part of a first set of arms of the plurality of arms and a second coil is part of a second set of arms of the plurality of arms, the first and second sets of arms extending radially from different portions of the core, the method further comprising:
transmitting the electromagnetic energy into the pipe through contact of the pipe by the first set of arms; and
receiving the secondary field from the pipe through contact of the pipe by the second set of arms.

17. The method of claim 14, wherein the transmit coil is wrapped around the core or the respective arm.

18. A system comprising:
a downhole tool housing configured to be lowered into a borehole comprising a pipe, the downhole tool housing including an inspection tool comprising:
a core having an axial length, wherein the axial length is set based on a desired depth of inspection radially from the core into the pipe; and
a plurality of arms mechanically coupled to and extending radially from the core, wherein the core and the plurality of arms comprise a magnetic material and wherein the plurality of arms further comprise:
a first pair of centralizer arms coupled to an upper portion of the core and extending radially from the core;
a second pair of centralizer arms coupled to a lower portion of the core and extending radially from the core;
a first pair of coil arms coupled to a central portion of the core and extending radially from the core, each arm of the first pair of coil arms coupled to a respective one of the first pair of centralizer arms at respective first and second ends, each arm comprising a respective coil;
a second pair of coil arms coupled to the central portion of the core and extending radially from the core, each arm of the second pair of coil arms coupled to a respective one of the second pair of centralizer arms at respective third and fourth ends, each arm comprising a respective coil; and
a plurality of magnetic brushes, each brush coupled to a respective one of the first, second, third, and fourth ends;
wherein the first and second pairs of centralizer arms and the first and second pairs of coil arms comprise a magnetic material.

19. The system of claim 18, wherein the inspection tool is disposed in a wireline tool or a drillstring tool.

* * * * *